(12) United States Patent
de Jong (10) Patent No.: US 8,472,773 B2
(45) Date of Patent: Jun. 25, 2013

(54) FIBER OPTIC CONNECTOR HOLDER

(75) Inventor: Michael de Jong, Colleyville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 342 days.

(21) Appl. No.: 12/851,612

(22) Filed: Aug. 6, 2010

(65) Prior Publication Data

US 2012/0033926 A1 Feb. 9, 2012

(51) Int. Cl.
*G02B 6/00* (2006.01)
*G02B 6/36* (2006.01)

(52) U.S. Cl.
USPC ............................................. 385/135; 385/53

(58) Field of Classification Search
None
See application file for complete search history.

(56) References Cited

U.S. PATENT DOCUMENTS

| | | | |
|---|---|---|---|
| 6,574,022 B2 | 6/2003 | Chow et al. | 359/189 |
| 6,592,245 B1 | 7/2003 | Tribelsky et al. | 362/551 |
| 6,760,530 B1 | 7/2004 | Mandry | 385/135 |
| 7,171,100 B2 | 1/2007 | Solheid et al. | 385/135 |
| 7,187,838 B2 | 3/2007 | Feustel et al. | 385/135 |
| 7,194,181 B2 | 3/2007 | Holmberg et al. | 385/135 |
| 7,198,409 B2 * | 4/2007 | Smith et al. | 385/53 |
| 7,200,317 B2 | 4/2007 | Reagan et al. | 385/139 |
| 7,218,827 B2 | 5/2007 | Vongseng et al. | 385/135 |
| 7,245,809 B1 | 7/2007 | Gniadek et al. | 385/135 |
| 7,277,620 B2 | 10/2007 | Vongseng et al. | 385/135 |
| 7,295,747 B2 | 11/2007 | Solheid et al. | 385/135 |
| 7,369,741 B2 | 5/2008 | Reagan et al. | 385/139 |
| 7,400,816 B2 | 7/2008 | Reagan et al. | 385/139 |
| 7,406,242 B1 | 7/2008 | Braga | 385/135 |
| 7,428,363 B2 | 9/2008 | Leon et al. | 385/135 |
| 7,471,869 B2 | 12/2008 | Reagan et al. | 385/139 |
| 7,474,828 B2 | 1/2009 | Leon et al. | 385/135 |
| 7,519,259 B2 | 4/2009 | Smith et al. | 385/135 |
| 7,526,172 B2 | 4/2009 | Gniadek et al. | 385/135 |
| 7,526,174 B2 | 4/2009 | Leon et al. | 385/136 |
| 7,546,018 B2 | 6/2009 | Hendrickson et al. | 385/135 |
| 7,623,749 B2 | 11/2009 | Reagan et al. | 385/135 |
| 2002/0131135 A1 | 9/2002 | Chow et al. | 359/189 |
| 2005/0129379 A1 | 6/2005 | Reagan et al. | 385/135 |
| 2006/0008231 A1 | 1/2006 | Reagan et al. | 385/135 |
| 2006/0034578 A1 | 2/2006 | Allen et al. | 385/135 |

(Continued)

FOREIGN PATENT DOCUMENTS

WO 2008/150408 A1 12/2008
WO 2009/110421 A1 9/2009

OTHER PUBLICATIONS

Patent Cooperation Treaty Form ISA/220, Dec. 29, 2011, pp. 3-4.
US 7,454,114, 11/2008, Reagan et al. (withdrawn)

*Primary Examiner* — Tina Wong
(74) *Attorney, Agent, or Firm* — John H. Vynalek (57) ABSTRACT

A fiber optic connector holder having a frame and a plurality of clips attached to the frame is disclosed. The clips are adapted to releasably hold a plurality of fiber optic connectors in a certain arrangement. The fiber optic connectors may be attached at or through the boot to optical fibers, which may be, legs of a splitter module, fiber optic cables of a cable harness, or the like. The fiber optic connector holder and the optical fibers, and the splitter module, cable harness, or the like, may be shipped to an installation site. At the installation site, the fiber optic connector holder may be used to orient the fiber optic connectors to facilitate the engagement of the fiber optic connectors in and/or to parking locations.

23 Claims, 7 Drawing Sheets

U.S. PATENT DOCUMENTS

| | | | |
|---|---|---|---|
| 2006/0093302 A1 | 5/2006 | Solheid et al. | 385/135 |
| 2006/0165365 A1 | 7/2006 | Feustel et al. | 385/135 |
| 2006/0228086 A1 | 10/2006 | Holmberg et al. | 385/135 |
| 2006/0263029 A1 | 11/2006 | Mudd et al. | 385/135 |
| 2006/0285807 A1 | 12/2006 | Lu et al. | 385/92 |
| 2007/0031100 A1 | 2/2007 | Garcia et al. | 385/135 |
| 2007/0036503 A1 | 2/2007 | Solheid et al. | 385/134 |
| 2007/0092195 A1 | 4/2007 | Solheid et al. | 385/135 |
| 2007/0147765 A1 | 6/2007 | Gniadek et al. | 385/135 |
| 2007/0165995 A1 | 7/2007 | Reagan et al. | 385/135 |
| 2007/0274661 A1 | 11/2007 | Allen et al. | 385/135 |
| 2008/0008436 A1 | 1/2008 | Reagan et al. | 385/135 |
| 2008/0008437 A1 | 1/2008 | Reagan et al. | 385/135 |
| 2008/0013910 A1 | 1/2008 | Reagan et al. | 385/135 |
| 2008/0080825 A1 | 4/2008 | Leon et al. | 385/135 |
| 2008/0080826 A1 | 4/2008 | Leon et al. | 385/135 |
| 2008/0080827 A1 | 4/2008 | Leon et al. | 385/135 |
| 2008/0080828 A1 | 4/2008 | Leon et al. | 385/135 |
| 2008/0124039 A1 | 5/2008 | Gniadek et al. | 385/135 |
| 2008/0152290 A1 | 6/2008 | Graff et al. | 385/135 |
| 2008/0170824 A1 | 7/2008 | Hendrickson et al. | 385/53 |
| 2008/0298764 A1 | 12/2008 | Bloodworth et al. | 385/135 |
| 2009/0097813 A1 | 4/2009 | Hill | 385/135 |
| 2009/0115999 A1 | 5/2009 | Watte et al. | 356/73.1 |
| 2009/0238529 A1 | 9/2009 | Wakileh et al. | 385/135 |
| 2009/0263096 A1 | 10/2009 | Solheid et al. | 385/135 |
| 2009/0263097 A1 | 10/2009 | Solheid et al. | 385/135 |
| 2009/0274432 A1 | 11/2009 | Iwaya | 385/139 |
| 2009/0285540 A1 | 11/2009 | Reagan et al. | 385/135 |
| 2009/0290843 A1 | 11/2009 | Reagan et al. | 385/135 |
| 2009/0297111 A1 | 12/2009 | Reagan et al. | 385/135 |
| 2010/0310226 A1 * | 12/2010 | Wakileh et al. | 385/139 |

* cited by examiner

FIBER OPTIC CONNECTOR HOLDER

BACKGROUND

The disclosure relates to fiber optic components, and more particularly to a fiber connector holder which may be used when shipping a component or assembly having connectorized fiber optic cables, including, without limitation the legs of a fiber optic splitter module, the fiber optic cables of a cable harness, or the like, and for facilitating the connection of the fiber optic connectors to parking locations.

Fiber optic terminals in a fiber optic network may be referred to as local convergence points (LCP), fiber distribution terminals (FDT), fiber distribution hubs (FDH), and the like. Such fiber optic terminals are typically cabinets or enclosures which may house fiber connection points, parking locations, splitters and cable harnesses, as well as other components. This enables the transmission of optical signals over optical fibers connected to the terminals and extended towards the subscriber premises in the optical networks. The splitters split an optical signal from a network operator or service provider into many optical signals for distribution to subscribers. Thus, the fiber optic terminal provides a convergence point for the fibers and the optical signals between the network operator or service provider and the subscriber.

Depending on the loading, i.e. the number of subscribers connected to a particular fiber optic terminal, all of the fiber connection points may not be used. In fact, a fiber optic terminal may be designed to have more fiber connection points than needed to provide additional capacity for growth of that portion of the fiber optic network. Additionally, persons or other entities may have elected to not receive fiber optic service. Nonetheless, optical fibers connected to the premises of such persons or entities may routed to the fiber optic terminal and connected to the fiber connection point. However, the optical fibers from those premises will not be connected to active optical fibers of the distribution cable providing the optical service to the fiber optic terminal. Instead the active optical fibers, either from the splitter or directly from the distribution cable are connected to a parking location in the fiber optic terminal If the person or entity, subsequently chooses to have fiber optic service, an active optical fiber is moved from the parking location to the appropriate fiber connection point and optically connected to the optical fiber establishing optical service from the service provider to that new subscriber.

SUMMARY

One embodiment includes a fiber optic connector holder having a frame and a plurality of clips attached to the frame. The clips are adapted to releasably hold in a certain arrangement a plurality of fiber optic connectors, each of which having a body, a dust cap and a boot. The clips may releasably hold the fiber optic connector by the boot. The fiber optic connectors may be attached to optical fibers at or through the boot. Further, the dust cap may extend from or past the frame to allow it to engage with a parking location. As non-limiting examples, the optical fibers may be as fiber optic cables that are legs of a splitter module, may be as fiber optic cables that are part of a cable harness, or may be any other loose or assembly of optical fibers and/or fiber optic cables. In this way, the fiber optic connectors, and any associated optical fibers and/or fiber optic cables, may be organized for any purpose, for example, for shipping to an installation site.

Additionally, once at the installation site, the fiber optic connector holder may be used to orient the fiber optic connectors to facilitate the engagement of the fiber optic connectors in and/or to parking locations. At least a portion of each fiber optic connector may engage in a parking location. For example, the portion of the fiber optic connector that engages with the parking location may be the dust cap. This is facilitated as the dust cap may extend from or past the frame. Then each fiber optic connector may be transferred from the fiber optic connector holder to the parking locations and attached to the parking location using a latch on the fiber optic connector, and/or a holding device on the parking location, such as a parking clip, which engages a portion of the fiber optic connector, for example, the boot. The parking locations may be located, positioned and/or mounted to hardware, as non-limiting examples, may include an enclosure, a cabinet, or the like.

A further embodiment includes a method for holding and facilitating the attachment of a fiber optic connector. The method includes providing a fiber optic connector holder having a frame and a plurality of clips attached to the frame. Each of the plurality of clips is adapted to releasably hold a fiber optic connector. The fiber optic connector may have a body, a dust cap and a boot. The method also includes inserting the fiber optic connector in one of the plurality of clips such that the one of the plurality of clips holds the fiber optic connector by the boot, and such that the dust cap extends from the frame. Further, the method includes shipping the fiber optic connector holder to an installation site, engaging the dust cap with a parking location at the site, releasing the fiber optic connector from the one of the plurality of clips, and transferring and attaching the fiber optic connector to the parking location.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to the present preferred embodiment(s), examples of which are illustrated in the accompanying drawings. Whenever possible, the same reference numerals will be used throughout the drawings to refer to the same or like parts.

The terms "optical fibers" and/or "fiber optic cables" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Figures 1, 1A:
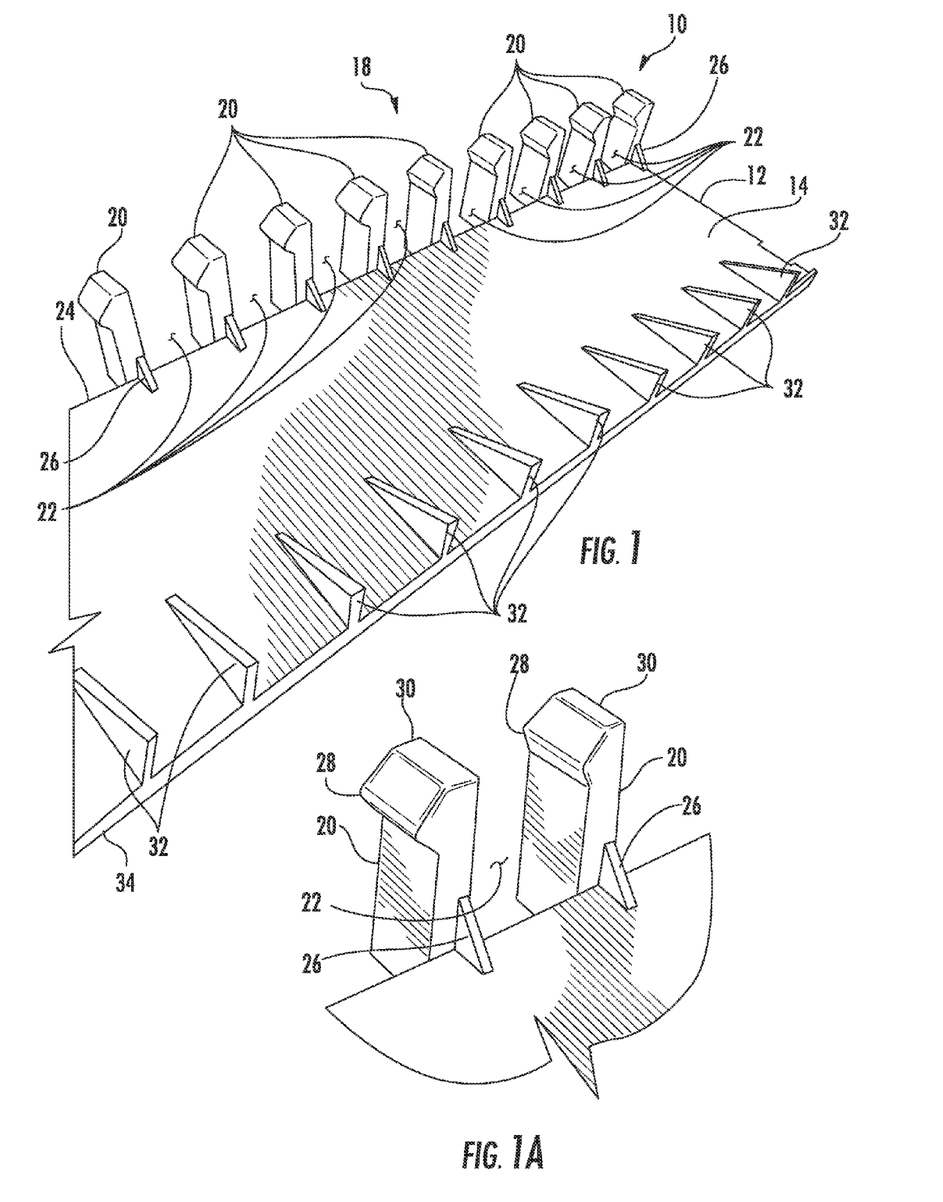
FIG. 1 is a perspective view an embodiment of a fiber optic connector holder as disclosed herein.
FIG. 1A is a detail view of a clip of the fiber optic connector holder of FIG. 1.

One embodiment of the fiber optic connector holder is shown in FIG. 1, and is designated generally throughout by the reference numeral 10. The fiber optic connector holder 10 may be used to hold, in a certain arrangement, fiber optic connectors, particularly fiber optic connectors attached to optical fibers. As non-limiting examples, the optical fibers may be legs of a splitter module, may be fiber optic cables that are part of a cable harness, or may be any other loose or assembly of optical fibers. In this way, the fiber optic connectors, and any optical fibers connected thereto, may be organized for any purpose, including, for example, for shipping to an installation site. Additionally, once at the installation site, the fiber optic connector holder 10 may be used to orient the fiber optic connectors to facilitate the engagement of the fiber optic connectors in and/or to parking locations. At least a portion of each fiber optic connector may engage with a parking location. For example, the portion of the fiber optic connector that engages with the parking location may be the dust cap. Then each fiber optic connector may be transferred from the fiber optic connector holder 10 to the parking locations and attached to the parking location. A latch on the fiber optic connector may be used to attach the fiber optic connector to the parking location. Alternatively or additionally, a holding device on the parking location, such as a parking clip, may engage and retain the fiber optic connector. The parking locations may be located, positioned and/or mounted to hardware, including, as non-limiting examples, an enclosure, a cabinet, or the like.

In this regard, the fiber optic connector holder 10 has a frame 12 with a first surface 14, a second surface 16 (not shown in FIG. 1) and clips 18. The clips 18 are formed by a series of walls 20 extending generally perpendicularly from the first surface 14. The walls 20 may be attached to the frame 12 along and adjacent to a first edge 24 of the frame 12. A brace 26 provides additional support and strength to the wall 20. The space between two consecutive walls 20 defines a channel 22. The series of walls 20, thereby, forms a series of channels 22. The walls 20 and the channels 22 define a plurality of clips 18, attached to the frame 12 adjacent to the first edge 24 of the frame 12. As shown in additional detail in FIG. 1A, a retainer tab 28 protrudes from a distal end 30 of the wall 20 towards and into the channel 22. Although, only one retainer tab 28 is shown protruding from each wall 20 in the same direction, it should be understood that more than one retainer tab 28 may protrude from the wall 20, in the same or different directions. Consecutive walls 20 and the retainer tab 28 act to retain a fiber optic connector (not shown in FIG. 1A) in the channel 22. Each clip 18, comprising the walls 20 with the retainer tab 28 and the channel 22, is adapted to releasably hold a fiber optic connector, as will be further described below. Referring again to FIG. 1, partitions 32 extend from the first surface 14 adjacent to a second edge 34. Each of the partitions 32 aligns generally with a respective wall 20. A fiber optic connector releasably held by one of the clips 18 may locate between two consecutive partitions 32. In this manner, the clips 18 and the partitions 32 may act to retain the fiber optic connectors in a certain arrangement, which is shown in FIGS. 2 and 3.

Figure 2:
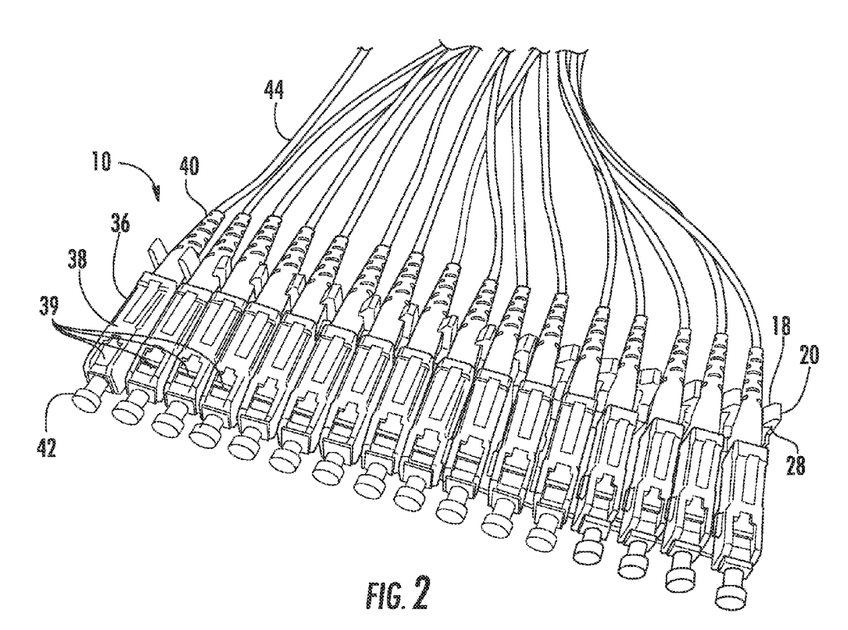
FIG. 2 is a perspective view of the fiber optic connector holder of FIG. 1 with fiber optic connectors engaged thereon.

In FIG. 2, the frame 12 of the fiber optic connector holder 10 is shown with fiber optic connectors 36 releasably held by the clips 18 on the first surface 14 (hidden in FIG. 2 by the fiber optic connectors 36). The fiber optic connector 36 has a body 38 with a boot 40 extending from one end of the body 38. A dust cap 42 extends from the other end of the body 38. The fiber optic connector 36 also has a latch 39, which is exposed from the frame 12 when the fiber optic connector 36 is releasably held by the clip 18. This allows the latch 39 to attach or retain the fiber optic connector 36 to a parking location after the fiber optic connector 36 is transferred from the fiber optic connector holder 10 to the parking location. Additionally, in FIG. 2, the fiber optic connectors 36 are shown attached to ends of the optical fibers 44 at and/or through the boot 40.

The clip 18 is adapted to releasably hold the fiber optic connector 36 by the boot 40. The wall 20 of the clip 18 is resilient. When pressure is put on the retainer tab 28, for example, by the boot 42, the wall 20 flexes or moves to enlarge the width of the channel 22 at the distal end 30. The boot 40 may then be inserted in the channel 22 past the retaining tab 28. With the boot 40 in the channel 22, the distal end 30 of the wall 20 returns to its initial position. The retainer tab 28 covers at least a portion of the boot 40 so that the boot 40, and, therefore, the fiber optic connector 36 is releasably held by the clip 18. In this way, the plurality of clips 18 is configured to releasably hold a plurality of fiber optic connecters 36 in a certain arrangement. Additionally, the body 40 of the fiber optic connector 36 friction fits between two of the partitions 32 to assist in retaining the fiber optic connectors 36 in the certain arrangement while engaged with the fiber optic connector holder 10. In this manner, the fiber optic connector 36 may remain engaged with the fiber optic connector holder 10 during shipping of the fiber optic connector holder 10 to the installation site, and when the fiber optic connectors 36 are being transferred from the fiber optic connector holder 10 to the parking locations at the installation site. In FIG. 2, the certain arrangement is shown as a side-by-side alignment.

Figure 3:
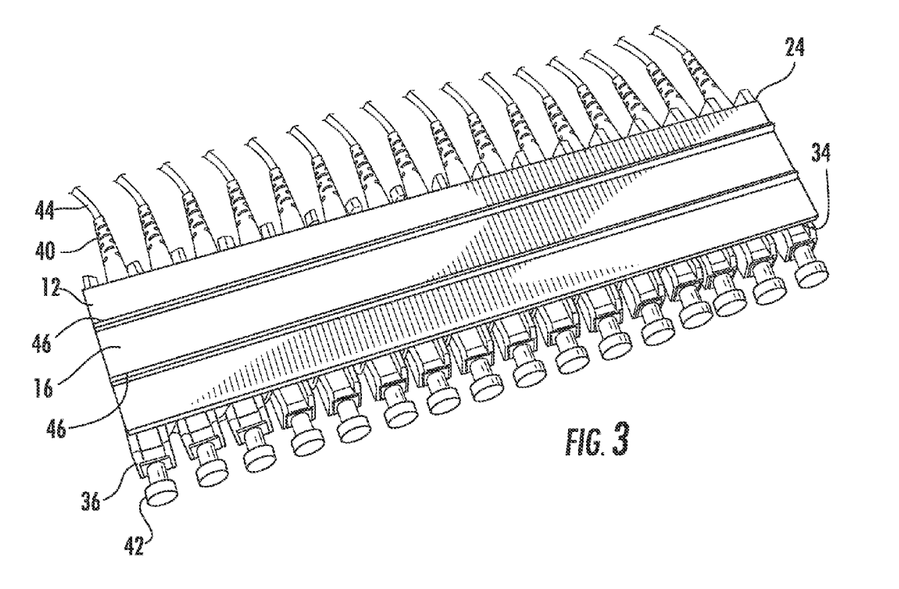
FIG. 3 is an inverse perspective view of the fiber optic connector holder of FIG. 2.

The side-by-side alignment also can be seen with reference to FIG. 3. Although a side-by-side aligned arrangement is shown in FIGS. 2 and 3, it should be understood that the fiber optic connector holder 10 may incorporate any arrangement of fiber optic connectors 36 as may be desired or appropriate for the application. In FIG. 3, the second surface 16 of the frame 12 of the fiber optic connector holder 10 is shown with the fiber optic connectors 36. The dust cap 42 extends from or past the second edge 34 of the frame 12. In this way, the dust cap 42 is exposed to allow it to engage with the parking location, as will be discussed in more detail later. Raised stiffeners 46 extend from the second surface 16. In the embodiment shown in FIG. 3, the stiffeners 46 extend along the length of the frame 12 and the alignment of the fiber optic connectors 36 engaged in the fiber optic connector holder 10. The stiffeners 46 provide stiffening and support to the frame 12. Thus, the stiffeners 46 inhibit the frame 12 from flexing or bending, including during shipping of the fiber optic connector holder 10. Flexing or bending of the frame 12 may result in one or more of the fiber optic connectors 36 unintentionally loosening from the clip 20 and disengaging from the fiber optic holder 10. Additionally, with the stiffeners 46, the fiber optic connector holder 10 may be more easily handled and oriented to allow a portion of the fiber optic connector 36, for example, the dust cap 42 to engage with a parking location and to facilitate the transfer and attachment of the fiber optic connector 36 to the parking location, which is discussed in more detail with reference to FIGS. 4 and 5. Although in FIG. 3, the stiffeners 46 are shown extending along the length of the frame 12, it should be understood that the stiffeners 46 may be oriented in any manner, or other means of stiffening and/or support may be used.

Figure 4:
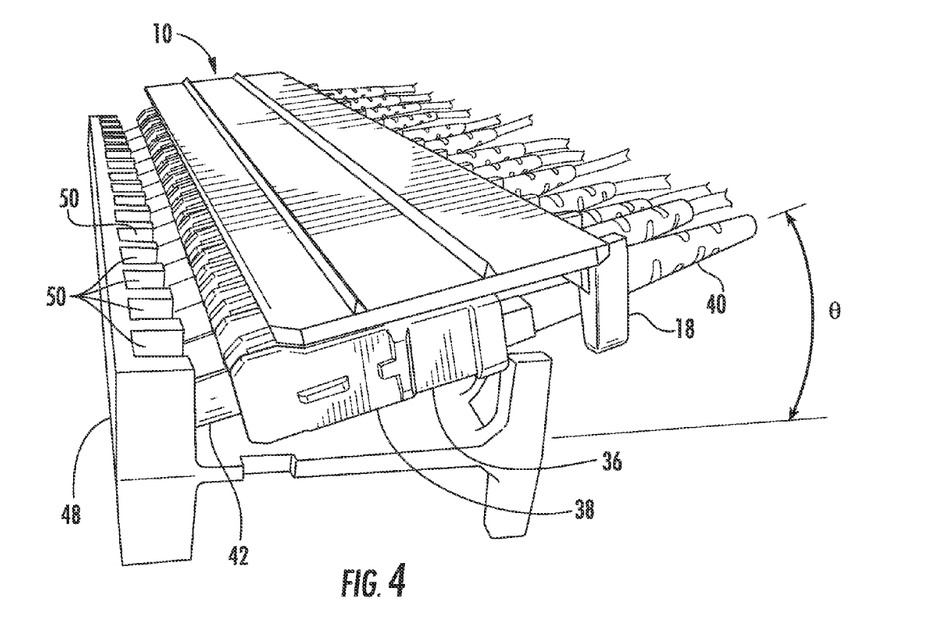
FIG. 4 is a perspective view of the fiber optic connector holder of FIG. 1 with dust caps of the fiber optic connectors engaged with parking locations of a parking assembly.

FIG. 4 shows the fiber optic connector holder 10 and a parking assembly 48. The parking assembly 48 has a plurality of parking locations 50. The dust cap 42 of each of the fiber optic connectors 36 are shown engaged with respective parking locations 50. Further, the fiber optic connector holder 10 is shown at an angle θ which facilitates the dust caps 42 to engage with the parking locations 50. The angle θ may be any suitable angle to allow the fiber optic connector holder 10 to orient with the parking assembly 48 and the parking locations 50. Additionally, the clips 18 are spaced along the frame 12 so that each fiber optic connector 36 aligns with a respective parking location 50 in the parking assembly 48. In other words, the certain arrangement of the clips 18 aligns the plurality of fiber optic connectors 36 in a spacing and orientation to match and/or align with the spacing and orientation of a plurality of parking locations 50. In this way, the frame 12 is adapted to allow each of the plurality of fiber optic connectors 36 to be attached to respective ones of the plurality of parking locations 50 in the certain arrangement. The clip 18 is configured to allow the fiber optic connector 36 to be released when at least a portion of the fiber optic connector 36 is engaged with the parking location 50. In FIG. 4, the portion of the fiber optic connector 36 engaged with the parking location 50 is the dust cap 42. While all of the dust caps 42 are engaged with the respective parking locations 50, all of the boots 40 are shown still releasably held by the clips 18.

Figure 5:
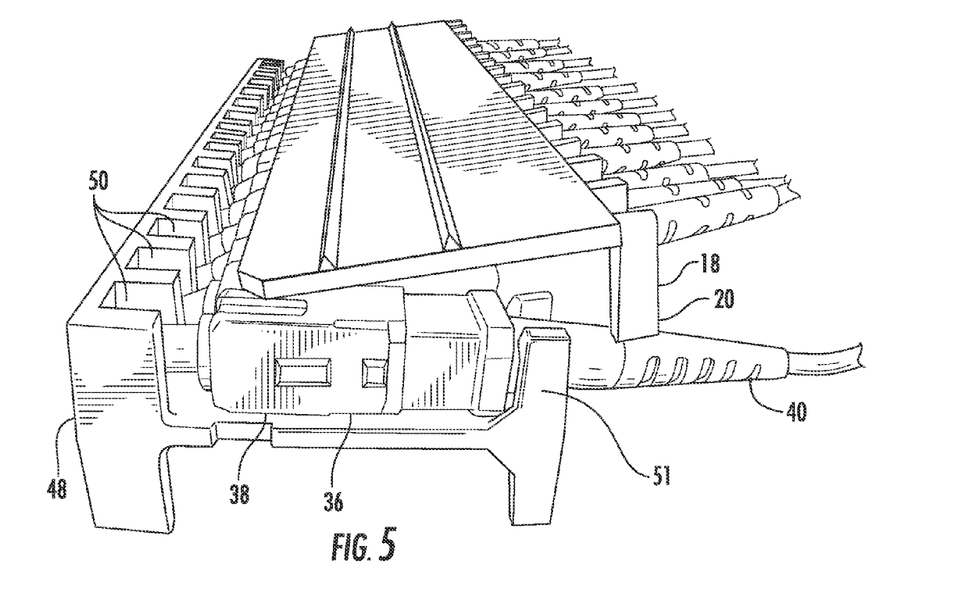
FIG. 5 is a perspective view of the fiber optic connector holder of FIG. 1 with dust caps of the fiber optic connectors engaged with parking locations of a parking assembly and with one fiber optic connector transferred to one of the parking location.

When at least one of the dust caps 42 of a fiber optic connector 36 is engaged with the parking location 50, that fiber optic connector 36 may then be released or disengaged from the respective clip 18 and transferred to the respective parking location 50 as shown in FIG. 5. In FIG. 5 a fiber optic connector 36 is shown as transferred from the fiber optic connector holder 10 to the parking location 50 of the parking assembly 48. The fiber optic connector 36 may be transferred by forcing the boot 40 away from the frame 12. As the boot 40 is forced away from the frame 12, the boot 40 exerts pressure on the retaining tab 28 causing the retaining tab 28 and the distal end 30 of the wall 20 to move increasing the channel 22 width at the distal end 30. The width of the channel 22 increases to the point where the retaining tab 28 does not cover the boot 40, and the boot 40 is allowed to release or disengage from the clip 18. The boot 40 may then be moved towards the parking location 50 which causes the body 38 of the fiber optic connector 36 to release from between the partitions 32 (not shown in FIG. 5) and transfer to the parking location 50. Further, one or more of the boots 40 may be forced at about the same time to transfer more than one fiber optic connector 36 from the fiber optic connector holder 10 to the respective parking locations 50 generally as a group. Additionally, when the fiber optic connector 36 is transferred to the parking location 50, the latch 39 (not shown in FIG. 5) attaches to a latching point in the parking location 50 to retain or attach the fiber optic connector 10 in the parking location 50. Alternatively or additionally, a device such as a parking clip 51 on the parking location 50 may engage the fiber optic connector 36 to retain the fiber optic connector 36 in the parking location 50. In FIG. 5, the parking clip 51 is shown engaging the boot 40 of the fiber optic connector 36.

Figure 6:
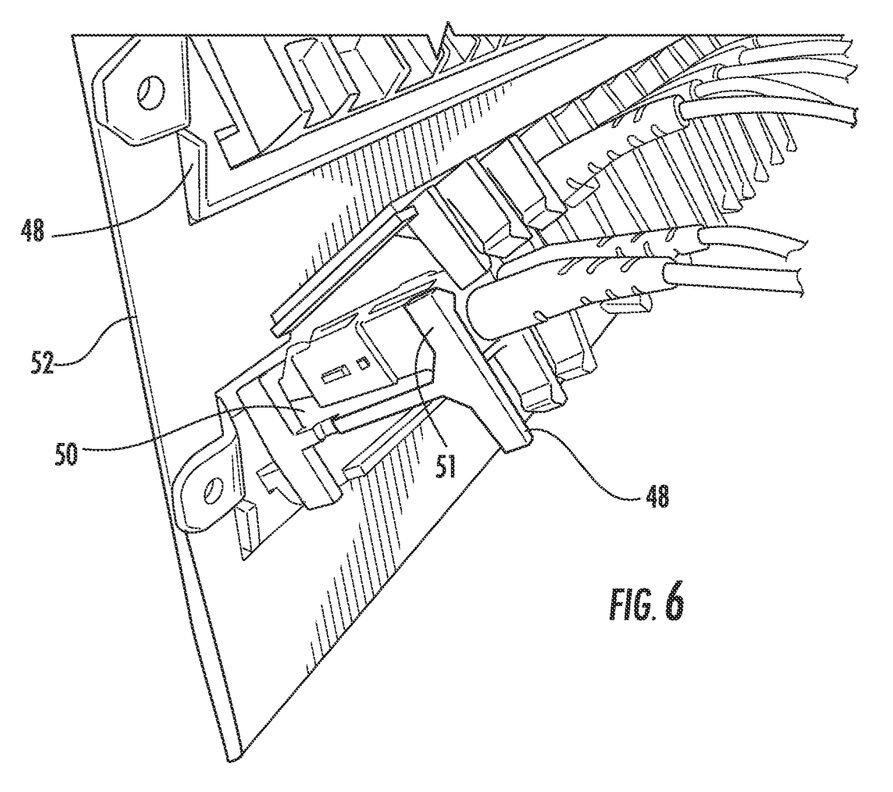
FIG. 6 is a is a partial perspective view of the fiber optic connector holder of FIG. 1 with dust caps of the fiber optic connectors engaged with parking locations of a parking assembly mounted to a wall of an enclosure.

Referring now to FIG. 6, there is shown two parking assemblies 48 mounted to a component or a piece of hardware 52, which may be a wall of an enclosure, a cabinet, or the like. To maximize the number of parking locations in a given space, the parking assemblies 48 may be separated by limited space and mounted such that the parking locations 50 do not extend orthogonally from the hardware, but are generally angled upwardly. The dust caps 42 are engaged with the parking locations 50 with two fiber optic connectors 36 shown as transferred from the fiber optic connector holder 10 to the parking locations 50. Thus, the fiber optic connector holder 10 with the certain arrangement of the clips 18 orients the dust caps 42 of the fiber optic connectors 36 in such a way to accommodate the space limitations between parking assemblies 48 and the non-orthogonal positioning of the parking locations 50. After all of the fiber optic connectors 36 are transferred from the fiber optic connector holder 10 to the parking locations 50, the fiber optic connector holder 10 can be discarded or used with other fiber optic connectors 36, whether attached to legs of a splitter module, fiber optic cables of a cable harness or any other application.

Figure 7A:
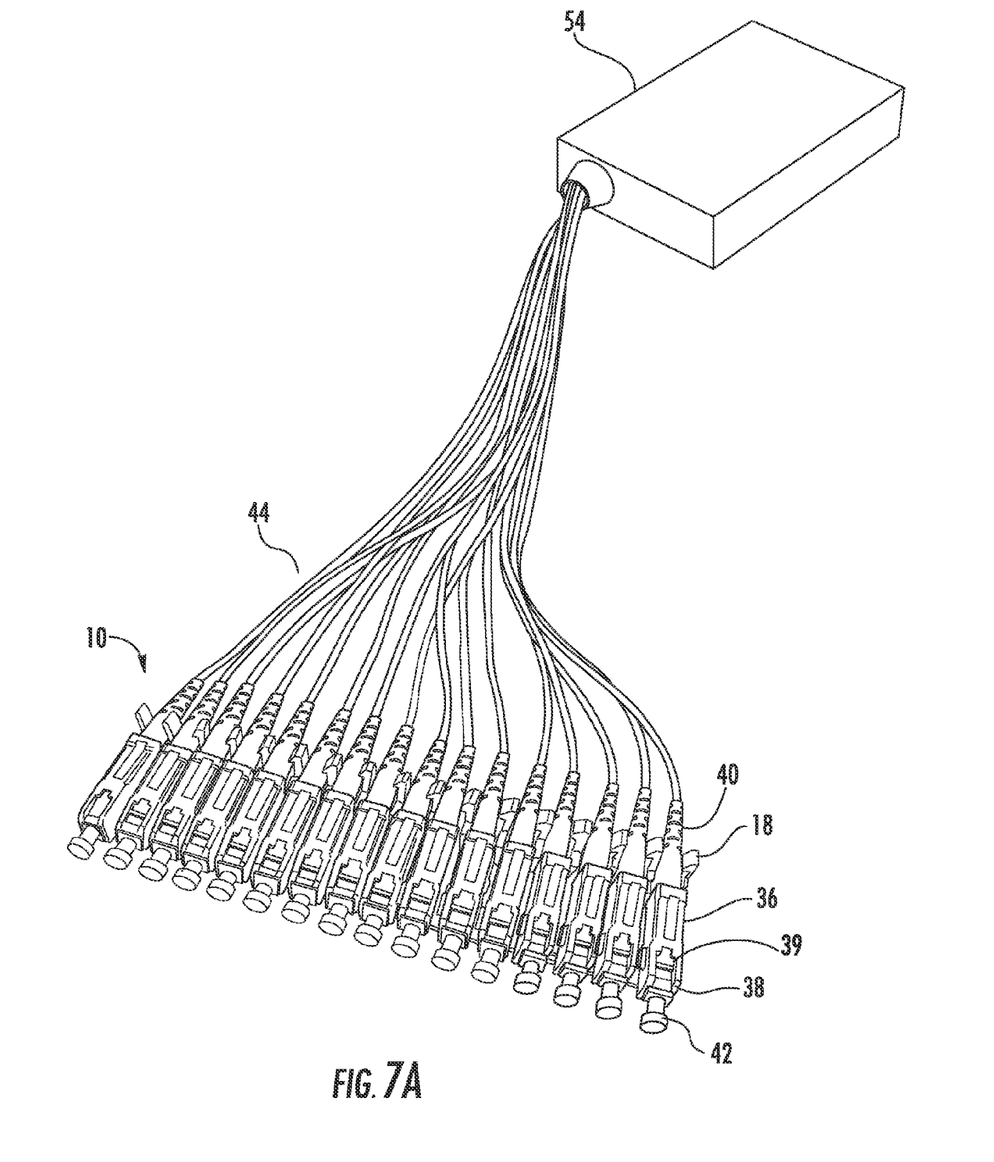
FIG. 7A is a view of a fiber optic connector holder and a splitter module, with fiber optic connectors engaged with the fiber optic connector holder and attached to legs of the splitter module.
Figure 7B:
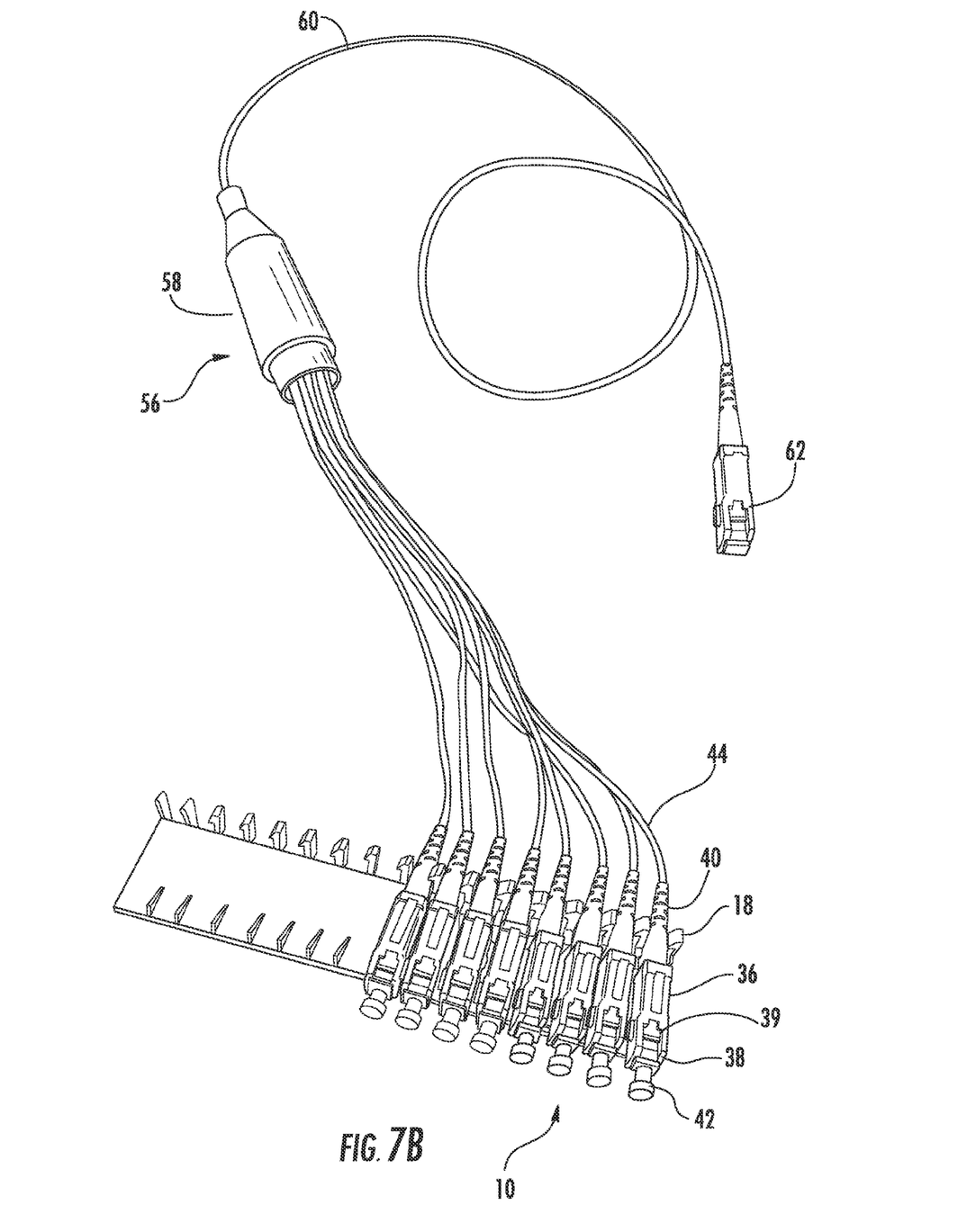
FIG. 7B is a view of a fiber optic connector holder, with fiber optic connectors engaged with the fiber optic connector holder and attached to fiber optic cables of a cable harness.

In this regard, FIGS. 7A and 7B show the fiber optic connector holder 10 used with the legs 44 of a splitter module 54 and with fiber optic cable 44 of a cable harness 56, respectively. Although, the fiber optic connector holder 10 may have any number of clips 18 to releasably hold fiber optic connectors 36, in FIG. 7A, the fiber optic connector holder 10 is shown as having 16 clips 18. The splitter module 54 is a 1×16 splitter, thereby having 16 legs 44. In this case, the fiber optic connector holder 10 can accommodate all of the fiber optic connectors 36 attached to each splitter leg 44. If the splitter module 54 has more legs 44, for example, the legs 44 of a 1×32 splitter, either a fiber optic connector holder 10 with 32 clips, two 16 clip fiber optic connector holders 10, four 8 clip fiber optic connector holders 10 may be used. The size of the fiber optic connector holder 10 will depend on what may be desired, optimal and/or practical for the application, which may be, as non-limiting examples, shipping of the splitter module 54, or attaching the fiber optic connectors 36 to the parking locations 50. FIG. 7A is not intended to in any manner be limiting and the fiber optic connector holder 10 may be used with any type or design of splitter module 54.

These considerations may also apply to the cable harness 56 as shown in FIG. 7B. In FIG. 7B, eight fiber optic cables 44 extend from a furcation body 58 to the fiber optic connector holder 10. The fiber optic cables 44 may each have an optical fiber separated from a multi fiber optical cable 60. The multi-fiber cable 60 may be terminated with a multi-fiber connector 62. Although, the fiber optic connector holder 10 has 16 clips, only eight clips are releasably holding fiber optic connectors 36, each being attached to one of the fiber optic cable 44.

Therefore, FIG. 7B illustrates that a fiber optic connector holder 10 that has 16 clips can be used to accommodate less than 16 fiber optic connectors 36, in this case eight fiber optic connectors 36. This may be used if a 16 clip fiber optic connector holder 10 is not available, or if it is not desirable to make an eight clip fiber optic connector holder 10.

Figure 8:
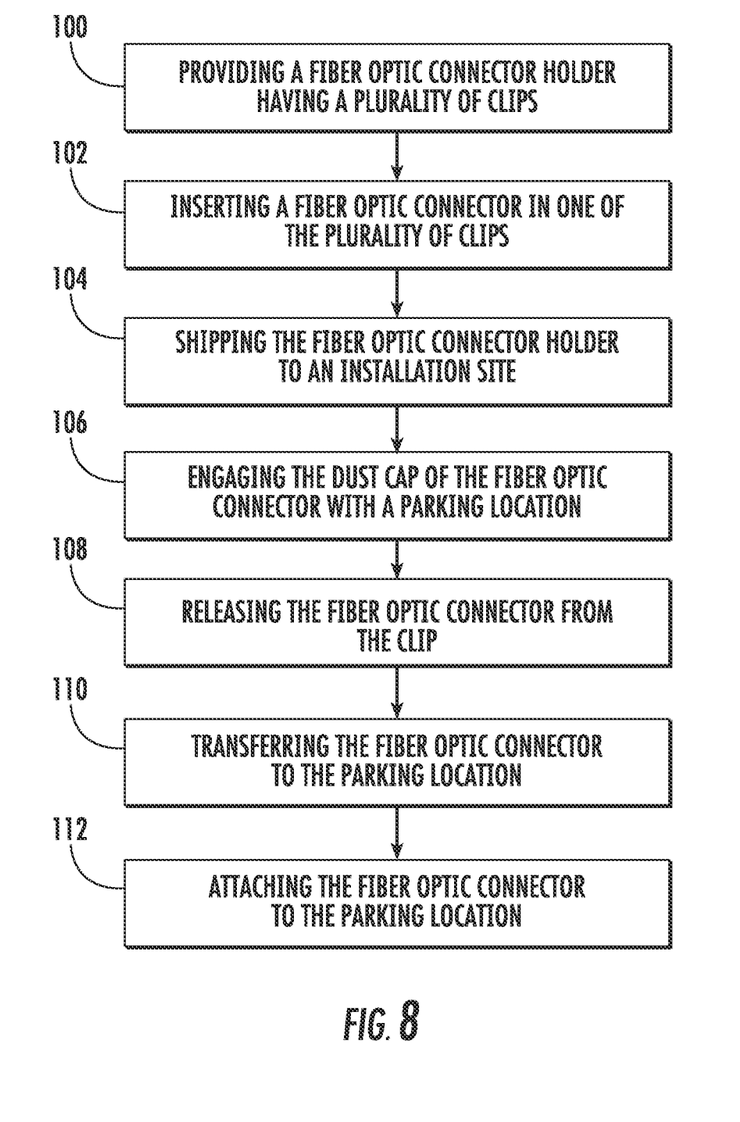
FIG. 8 is a flow diagram illustrating a method for holding and facilitating the attachment of a fiber optic connector.

Referring now to FIG. 8, there is shown a flow diagram illustrating a method for holding and facilitating the attachment of a fiber optic connector 36. The method may include providing a fiber optic connector holder 10 having a frame 12 and a plurality of clips 18 attached to the frame 12. Step 100. Each of the plurality of clips 18 is adapted to releasably hold a fiber optic connector 36. The fiber optic connector 36 may have a body 38, a dust cap 42 and a boot 40. The method also includes inserting the fiber optic connector 36 in one of the plurality of clips 18. Step 102. The fiber optic connector 36 is inserted in the clip 18 such that the one of the plurality of clips 18 holds the fiber optic connector by the boot 40, and such that the dust cap 42 extends from the frame 12. Further, the method includes shipping the fiber optic connector holder 10 to an installation site, Step 104, engaging the dust cap 42 with a parking location 50 at the site, Step 106, releasing the fiber optic connector 36 from the one of the plurality of clips 18, Step 108, transferring the fiber optic connector 36 to the parking location 50, Step 110 and attaching the fiber optic connector 36 to the parking location 50 using a latch 39 Step 112.

What is claimed is:

1. A fiber optic connector holder, comprising:
   a frame; and
   a plurality of clips attached to the frame, wherein at least one clip of the plurality of clips is adapted to releasably hold a fiber optic connector, wherein the fiber optic connector includes a dust cap; and
   wherein when the fiber optic connector is releasably held by the one clip of the plurality of clips the dust cap is allowed to engage with a parking location, and wherein the fiber optic connector is allowed to be released when the dust cap is engaged with the parking location.

2. The fiber optic connector holder of claim 1, wherein the clip is adapted to releasably hold a fiber optic connector during shipping.

3. The fiber optic connector holder of claim 1, wherein the fiber optic connector is allowed to attach to the parking location when the fiber optic connector is released from the clip.

4. The fiber optic connector holder of claim 1, wherein the dust cap extends from the end of the frame to allow the dust cap to engage with the parking location.

5. The fiber optic connector holder of claim 1, wherein the fiber optic connector is attached to the end of an optical fiber.

6. The fiber optic connector holder of claim 5, wherein the optical fiber is a leg of a splitter module.

7. The fiber optic connector holder of claim 5, wherein the optical fiber is part of a cable harness assembly.

8. The fiber optic connector holder of claim 1, wherein the plurality of clips is configured to hold a plurality of fiber optic connecters in a certain arrangement.

9. The fiber optic connector holder of claim 8, wherein the plurality of clips is configured to releasably hold the plurality of fiber optic connecters such that the plurality of fiber optic connectors is retained in the certain arrangement during shipping.

10. The fiber optic connecter holder of claim 8, wherein the certain arrangement is a side-by-side alignment.

11. The fiber optic connecter holder of claim 8, wherein the certain arrangement aligns the plurality of fiber optic connectors in a spacing and orientation to match the spacing and orientation of a plurality of parking locations.

12. The fiber optic connecter holder of claim 8, wherein the frame is adapted to allow each of the plurality of fiber optic connectors to be attached to respective ones of the plurality of parking locations in the certain arrangement.

13. The fiber optic connector holder of claim 1, wherein the fiber optic connector comprises a boot, and wherein the at least one of the plurality of clips is adapted to releasably hold the fiber optic connector by the boot.

14. The fiber optic connector holder of claim 1, wherein the fiber optic connector comprises a latch, and wherein the latch is exposed when the fiber optic connector is releasably held by the at least one of the plurality of clips to allow the latch to be attached to the parking location when the fiber optic connector is released from the at least one of the plurality of clips.

15. The fiber optic connector holder of claim 1, wherein the parking locations are mounted to an enclosure.

16. A fiber optic connector holder, comprising:
    a frame; and
    a plurality of clips attached to the frame, wherein the plurality of clips is adapted to releasably hold a plurality of fiber optic connectors in a certain arrangement,
    wherein the frame is adapted to allow a dust cap of each of the plurality of clips to engage with respective ones of the plurality of parking locations, and wherein the each of the plurality of clips allows respective ones of the plurality of fiber optic connectors to be released when the respective dust cap is engaged with the respective one of the plurality of parking locations.

17. The fiber optic connector holder of claim 16, wherein each of the plurality of fiber optic connectors comprises a boot, and wherein each of the plurality of clips releasably holds the respective ones of the fiber optic connectors by the boot.

18. The fiber optic connecter holder of claim 16, wherein the certain arrangement aligns the plurality of fiber optic connectors in a spacing and orientation to match the spacing and orientation of a plurality of parking locations.

19. The fiber optic connector holder of claim 16, wherein the fiber optic connector comprises a latch, and wherein the latch is exposed when the fiber optic connector is releasably held by the at least one of the plurality of clips to allow the latch to be attached to the parking location when the fiber optic connector is released from the at least one of the plurality of clips.

20. A method for holding and facilitating the attaching a fiber optic connector, comprising:
    providing a fiber optic connector holder comprising, a frame and a plurality of clips attached to the frame, wherein each of the plurality of clips are adapted to releasably hold a fiber optic connector comprising a dust cap and a boot;
    inserting a fiber optic connector in one of the plurality of clips such that the one of the plurality of clips holds the fiber optic connector by the boot, and such that the dust cap extends from the frame;
    engaging the dust cap with a parking location,
    releasing the fiber optic connector from the one of the plurality of clips; and
    attaching the fiber optic connector to the parking location.

21. The method of claim 20, further comprising shipping after the fiber optic connector holder with the fiber optic connector to an installation site.

22. The method of claim 20, wherein the fiber optic connector is attached to the end of a leg of a splitter module.

23. The method of claim 20, wherein the fiber optic connector is attached to the end of a fiber optic cable that is part of a cable harness.

\* \* \* \* \*